United States Patent [19] [11] Patent Number: 5,317,402
Wong et al. [45] Date of Patent: May 31, 1994

[54] DAISY CHAIN VIDEO SWITCHES

[75] Inventors: Hung Y. Wong, Solon; Mark W. Magalotti, Broadview Heights, both of Ohio

[73] Assignee: Picker International, Inc., Highland Heights, Ohio

[21] Appl. No.: 999,312

[22] Filed: Dec. 31, 1992

Related U.S. Application Data

[63] Continuation-in-part of Ser. No. 940,180, Sep. 3, 1992, Pat. No. 5,301,220.

[51] Int. Cl.⁵ .................................... H04N 5/268
[52] U.S. Cl. .................................. 348/705; 358/111; 378/114; 378/98.2
[58] Field of Search ................. 358/181, 98, 185, 111, 358/182, 183; 378/99, 114, 92; 340/717; H04N 5/268

[56] References Cited

U.S. PATENT DOCUMENTS

| 4,051,522 | 8/1977 | Healy | 358/181 |
| 4,218,709 | 8/1980 | Baxter | 358/181 |
| 4,930,144 | 5/1990 | Plut et al. | 378/99 |
| 5,101,272 | 3/1992 | Plut | 358/181 |
| 5,117,225 | 5/1992 | Wang | 340/717 |
| 5,127,394 | 7/1992 | Lane | 358/98 |

*Primary Examiner*—Victor R. Kostak
*Assistant Examiner*—Chris Grant

*Attorney, Agent, or Firm*—Fay, Sharpe, Beall, Fagan, Minnich & McKee

[57] ABSTRACT

A video processing system includes a plurality of identical video switch modules (A). Each of the video switch modules has matching inputs and outputs such that received signals can be passed through unchanged, enabling the modules to be connected in a daisy chain or series relationship. Each of the modules further includes inputs and outputs for receiving video signals from and sending video signals to procedure rooms (B). Preferably, each of the procedure rooms includes medical diagnostic apparatus (10-18) which produce one or more unprocessed video signals, a first video monitor (22) for displaying first processed video signals, a second monitor (24) for displaying second processed video signals, and a VCR (20) for recording and playing back second processed video signals. The daisy chain of video switch modules is interconnected at one end with a shared digital image processing system (C). Unprocessed video signals from a selected one of the procedure rooms are connected by its corresponding video switch module and the other daisy chained modules to the digital image processing system. The digital image processing system processes the received video signals and images from memory (34) to provide at least first and second processed video signals that are sent back through the daisy chained switch modules to the selected module.

18 Claims, 3 Drawing Sheets

DAISY CHAIN VIDEO SWITCHES

The present application is a continuation-in-part of U.S. application Ser. No. 07/940,180, filed Sep. 3, 1992, now U.S. Pat. No. 5,301,220.

BACKGROUND OF THE INVENTION

The present invention relates to the processing and handling of diagnostic video image data. The present invention finds particular application in conjunction with vascular diagnostic imaging systems and will be described with particular reference thereto. However, it is to be appreciated, that the invention may also find application in conjunction with the handling of other diagnostic image data.

In a vascular diagnostic system, an x-ray source is commonly disposed on one side of the patient and an image intensifier is disposed on the other side of the patient. The image intensifier converts the x-rays which are transmitted through the patient and strike the image intensifier into a corresponding optical image. That is, an optical or light image is generated in which the intensity of light at each point of the image varies in accordance with the intensity of radiation which passed through the patient and struck the image intensifier. A beam splitter is mounted to the image intensifier for selectively directing the optical image to one or more cameras. The cameras typically include video or electronic cameras and film cameras for generating single frame images and motion picture or video images.

The video images from the electronic camera are typically acquired and processed by a digital image processing system. Each diagnostic suite includes appropriate video monitors for displaying the digitally processed video images and a VCR for recording video electronic images. The VCR playback images may also be displayed in the diagnostic suite or on a control room reference image monitor. In addition to the current or live data from the video camera, the diagnostician commonly wishes to view one or more reference images. The reference image may be an image taken several minutes earlier, an image from an earlier examination, or the like. One common application of the reference image is in conjunction with radiation opaque dyes. After a reference image is recorded, the patient is injected with the radiation opaque dye. Both the live images and the recorded reference images are then displayed on the live and reference image monitors, respectively. The two images are to be compared for diagnostic purposes.

One of the problems with such systems is that the various electronic image signals do not have the same bandwidth. Typically, the live image is a high resolution image of 1024×1024 pixels or better, displayed at 30 or higher fps, in either progressive or interlace format. An S-type VCR records or plays back images with a much lower resolution, e.g. about 512×512 pixels per image at 30 fps interlaced. These lower resolution images are conveyed with a lower bandwidth signal. Typically, the VCR playback images are displayed on the reference image monitor which is usually dual rate type, capable of displaying both high resolution and S-type VCR images.

Typically, the output of the electronic camera is digitized and conveyed to a digital processing board which generates a low bandwidth downscan signal for recording on a VCR and a high bandwidth live signal for display on a high resolution live image monitor. Further, the digital processor board converts reference images stored in a video memory into high bandwidth reference signals for display on the reference image monitor.

Typically, a system may include more than one diagnostic imaging room as well as a central control console. The central control console and the digital processor boards are relatively expensive. Rather than provide each room with its own digital processor board, a significant cost savings can be achieved by sharing the digital processor board. This requires a relatively complex switching system for switching the camera outputs and the VCR outputs from each room to the digital processor board and the outputs from the digital processor board back to the appropriate monitors and VCRs in each room and the control console.

In a vascular diagnostic system with a large number of rooms, either a larger number of digital processor boards are required or an increasingly complex switching system. One of the problems with the prior art is that when a hospital adds additional rooms, a new switching system is required which can switch the digital processing board among a larger number of rooms. Analogously, manufacturers must inventory a large number of different size switching systems in order to accommodate the varying number of rooms which hospitals might order.

The present invention provides a new and improved daisy chain video switch system which overcome the above-referenced problems and others.

SUMMARY OF THE INVENTION

In accordance with the present invention, a video switch module is provided for switching up to a fixed number of rooms into communication with a digital processor board. The modules are selectively interconnectable with each other to increase the number of rooms among which selections can be made.

In accordance with a more specific implementation of the present invention, the video switching modules are interconnectable in a series or daisy chain configuration.

In accordance with a more specific aspect of the present invention, each module has corresponding inputs for receiving signals from the digital image processing system or other switches and feedthrough outputs for conveying corresponding signals to the digital processing system or other switch modules. Each switch module is selectively operable to switch the received signals directly to the output terminals in a feedthrough configuration such that the received signals pass directly therethrough.

Further, each module has camera and VCR inputs for a preselected small number of rooms and VCR and monitor outputs for the preselected small number of rooms. The module is controllable to switch the received input signal to the VCR or monitor outputs for one of the preselected number of rooms and to switch the camera and VCR inputs to the feedthrough outputs.

In accordance with yet another aspect of the present invention, each module has a digital control circuit which is uniquely addressable from the other control circuits for selectively lacing a selected switch module in switched communication with a selected one of its designated rooms and the other switch modules into their feedthrough mode.

In accordance with yet another aspect of the present invention, the interconnections between inputs and outputs within each switch is designed such that without any control signal or operating power, the live image monitor of each room controlled by the switch is automatically connected to one of the video input signals generated by the camera of the same room. This allows camera video images to be directly displayed during digital imaging system malfunction.

One advantage of the present invention is that it enables a plurality of rooms to be interconnected with a single digital image processing system.

Another advantage of the present invention is that only a single switch module need be maintained in inventory to provide systems with any number of rooms.

Another advantage of the present invention is that when the number of rooms in a system is expended, only a standard, modestly priced switch module is needed. The entire switching system need not be replaced with a larger switching system capable of handling a larger plurality of rooms.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
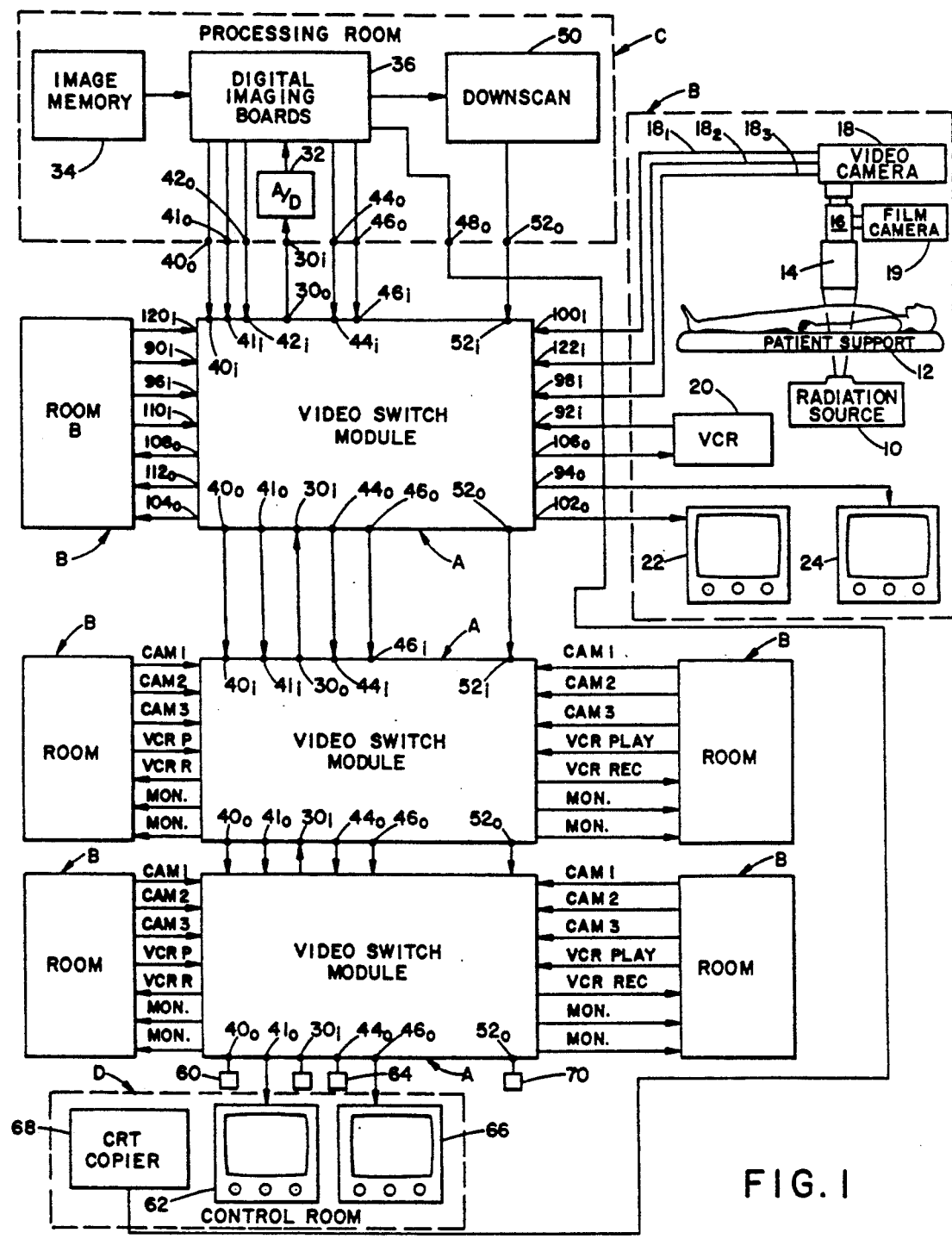
FIG. 1 is diagrammatic illustration of a multiple room vascular system in accordance with the present invention.

With reference to FIG. 1, a plurality of switch modules A are interconnected together in a daisy chain or series relationship. Each switch module is connected with one or more rooms B. The chain of video switch modules is interconnected with a digital image processing system C and a control room D. A digital control signal is sent to all of the video switch modules A which causes all but one of the modules to assume a flow-through mode. The one selected module assumes one of a plurality of switchable modes. In the flowthrough mode, each switch module passes signals received from the digital processing system C or another switch module A unaltered. The switch which is activated causes a selected signal(s) from the room to be passed on its output and causes a selected signal(s) received either from within the room or on the outputs from the digital image processing system or other video switches with selectable outputs.

Typically, each room B includes a source 10 of radiation which passes a beam of penetrating radiation through a patient on a support 12 to an image intensifier 14. The intensity of radiation which is received at each point on the image intensifier is determined by the amount of radiation that was absorbed along a path of travel between the source and that point on the image intensifier, particularly in the patient. The image intensifier converts the x-ray intensity variations into a corresponding optical image with corresponding optical light intensity variations. The optical image is directed by a beam splitter 16 to one or more cameras. The electronic camera 18 generates three identical video image signals. In the illustrated embodiment, an electronic camera 18 and a film camera 19 are illustrated.

Further, each room includes a VCR 20 for selectively recording and playing back video images. A live image monitor 22 displays live images generated by the digital imaging processing means C or one of the video image signals generated by the camera 18. A reference image display monitor 24 displays reference images generated by the digital imaging processing means C or the playback images from the VCR 20. The reference image monitor is a dual rate type, capable of displaying both high resolution reference images or lower resolution VCR playback images.

The imaging processing system C has a diagnostic image signal input 30, for receiving analog diagnostic image, signals. An analog-to-digital converter 32 converts the analog signals to digital signals. A mass storage image memory 34 stores digital image representations.

Digital imaging boards 36 convert the digitized image signals to three identical high resolution live image signals which are supplied on output lines $40_o$, $41_o$, and $42_o$. The digital imaging boards 36 convert the digital signals from the memory 34 to three identical high resolution reference image signals which are output on outputs $44_o$, $46_o$, and $48_o$. A downscan means 50 converts the high resolution digital signals to lower resolution digital video signals. Preferably, the downscan means reduces the bandwidth of the received video signals to an appropriate bandwidth for an S-type Video recorder. The lower bandwidth video signals are output on downscan output $52_o$.

Each of the video switch modules A includes first, second, and third live video or processed image signal input's $40_i$, $41_i$, and $42_i$ and live video processed image signal outputs $40_o$ and $41_o$. The first, second, and third live video signal inputs of the video switch module directly connected to the image processing system are connected to a corresponding live image output line of the image processing system. Each of the video switch module live image signal outputs are connected with a corresponding live video signal input of another video switch module A. One of the live video signal outputs 40 of the last video switch module in the chain is connected to a termination means 60, such as a resistor, and the other live video signal output $41_o$ is connected with a live video monitor 62 in the control room D.

In normal operation, the live image signal inputs $40_i$ and $41_i$, both of them originate from the digital imaging boards and go through the chain of video switches through live image signal feedthroughs. One live image signal input $40_i$ is intercepted by the switch module controlling the selected active room before going on to the next switch module or destination. The intercepted live image signal is connected to the live image monitor 22 of the selected active room. The other live image or processed image signal input $41_i$ is not intercepted, goes through the chain of video switches all the way to the control room live image monitor 62.

Analogously, each of the video switch modules A includes first and second reference video signal inputs $44_i$ and $46_i$ and reference video signal outputs $44_o$ and $46_o$. Each of the video switch module reference video signal inputs is connected to a corresponding reference video output of another video switch or the digital imaging boards. Analogously, each of the video switch module reference image signal outputs are connected with a corresponding reference video signal input of another video switch module A. One of the reference video signal outputs $44_o$ of the last video switch module in the chain is connected to a termination means 64, such as a resistor, and the other reference video signal output $46_o$ is connected with a reference image monitor 66 in the control room D.

In normal operation, both the reference image signal inputs $44_i$ and $46_i$, originate from the digital imaging boards and go through the chain of video switches through reference image signal feedthroughs. One of the reference image signal input $44_i$ is intercepted by the switch module controlling the selected active room before entering to the next switch module or destination. The intercepted reference image signal is then connected to the reference image monitor 24 of the selected active room. The other reference image signal input $46_i$ is not intercepted and goes through the chain of switch modules all the way to the control room reference image monitor 66. A CRT copier 68 in the control room is connected directly to the third reference image signal output $48_o$ of the digital imaging boards 36 for selectively converting received input video image signals into hard copies.

Analogously, each video switch module A has a downscan input 52 and a downscan output $52_o$. The downscan input of each switch module is connected with the downscan output of either the downscan means 50 or the downscan output of another video switch module. The downscan output of each switch module is connected either with another switch module or, in the case of the last switch module in the daisy chain, with a termination means 70, such as a resistor. In normal operation, the first switch module in 10 the chain would select either the third live video signal input $42_i$ or the downscan input $52_i$ to be available for VCR recording. The third live video signal is made available only if there is a VCR or other recording device capable of recording high resolution live images. The selected signal is then going through the chain of the video switches through the downscan feedthroughs, intercepted by the switch module associated with the active recording VCR. The intercepted signal is then connected to the active VCR recording output.

Figure 2A:
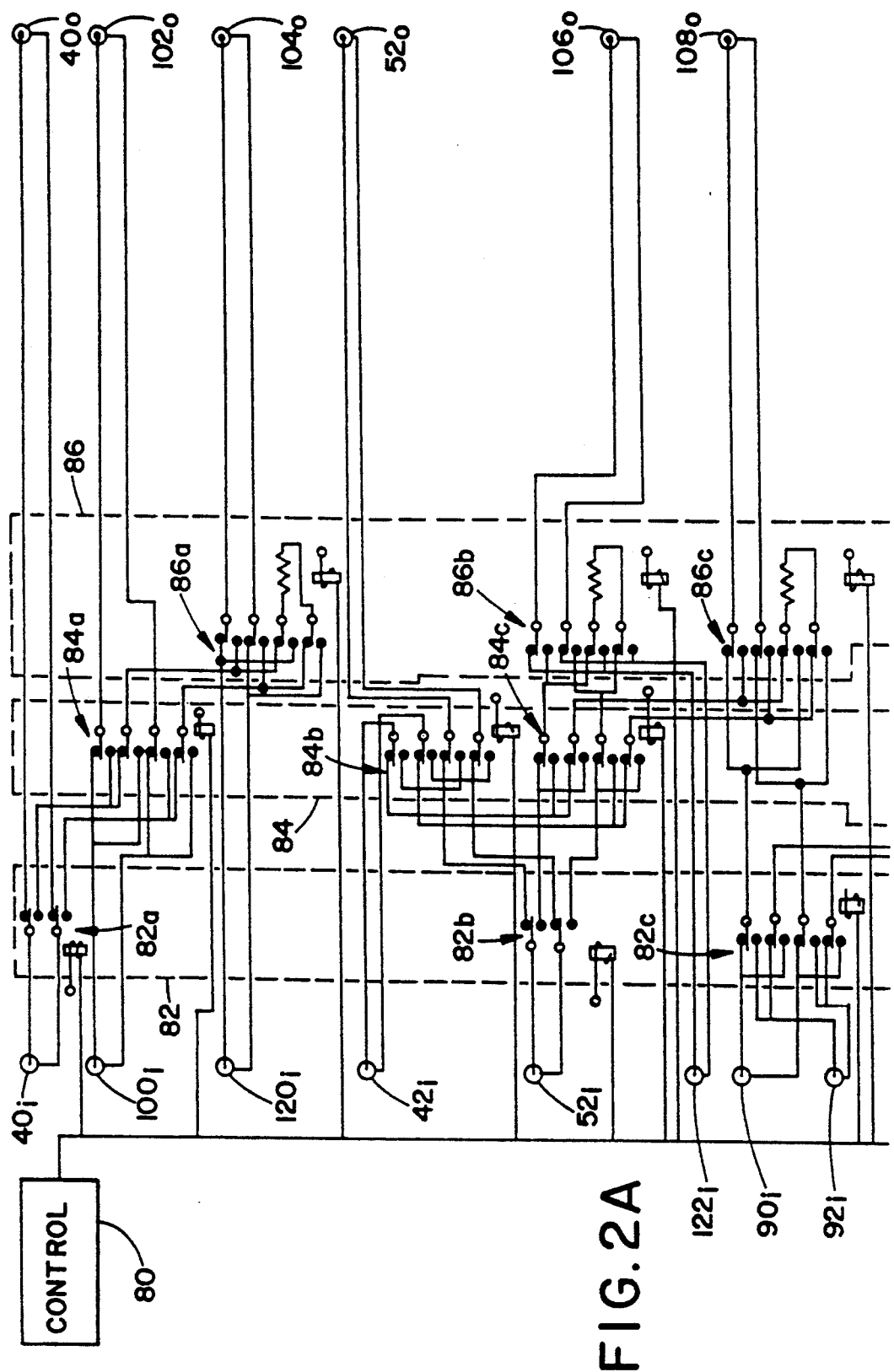
FIGS. 2A and 2B are diagrammatic illustration of one of the switch modules of FIG. 1.
Figure 2B:
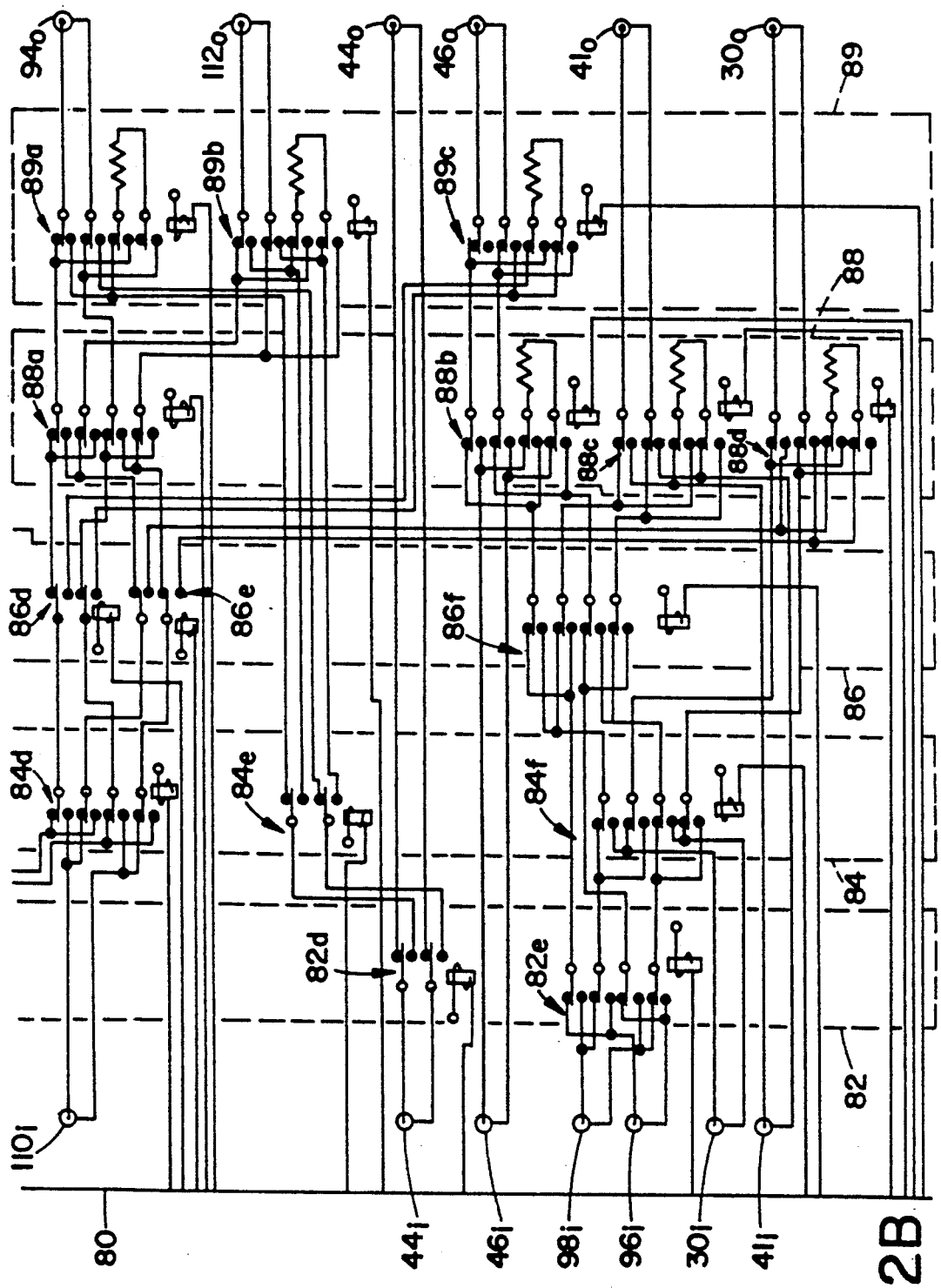

With reference to FIGS. 2A and 2B, each switch module A includes the flowthrough inputs and outputs discussed above plus inputs and outputs for the cameras, VCRs, and monitors of one or more rooms. Although an embodiment is illustrated in which each module can select between two rooms, as well as the flowthrough mode, each switch module A may be analogously configured to control one, two, or more than two rooms. In the illustrated two-room embodiment, every video switch module A is set to the desired operation mode by sending a digital control signal to a switch relay control means or bus 80. The relay control means 80 controls five relay means 82, 84, 86, 88, and 89 which determine the selected operation mode.

The relay means 82 includes a plurality of double throw switch means including a switch means $82a$ which connects the live input $40_i$ with the live output $40_o$ in the flowthrough mode. A switch means $82b$ controls whether the downscan input signal $52_i$ is made available to the downscan output $52_o$ or is to be recorded in either of the procedure rooms. A switch means $82c$ enables a second video image $18_2$ received on a camera signal input $90_i$ or $122_i$ from the camera 18 of one of the procedure rooms to be recorded directly by the VCR 20 of the same room. It also enables a selected procedure room VCR playback input $92_i$ to be displayed either on the reference image monitor 24 of the same room through output $94_o$ or on the reference image monitor of the selected room through the reference output $46_o$. A switch means $82d$ controls whether the reference input $44_i$ is connected with the reference output $44_o$ or whether it can be directed to the reference image monitor 24 of another procedure room. A switch means $82e$ controls whether diagnostic apparatus or video source inputs $96_i$ and $98_i$ from a third video signal $18_3$ of the camera 18 in each room are connectable with the auxiliary A/D output $30_o$ to be conveyed to the digital processing boards 36.

If the address on the control means so causes one of the rooms which a switch module A controls to be active, the second relay means 84 helps to select which room is active. More specifically, the second relay means 84 includes a switch means $84a$ for sending either the live signal received on input $40_i$ or a first camera signal $18_i$ received on diagnostic apparatus or video source input, such as a camera input $100_i$ or $120_i$ to the live monitor output $102_o$ or $104_o$ selected one of the two rooms which the switch module controls. A switch means $84b$ controls whether the downscan output $52_o$ receives the downscan signal or the third live signal $42_i$. A switch means $84c$ determines whether the third live signal received on input $42_i$ or the downscan input received on input $52_i$ is made available to the VCRs in the respective rooms for recording via VCR record outputs $106_o$ or $108_o$. A switch means $84d$ makes the VCR play output of the selected room received on input $92_i$ or $110_i$ available for selection for interconnection to a switch means $86d$ and a switch means $86e$. A switch means $84e$ controls to which of reference monitor outputs $94_o$ and $112_o$ the reference signal received on input $44_i$ is made available. A switch means $84f$ controls whether the auxiliary A/D input $30_i$ or the output of switch means $82e$ is made available to the A/D output $30_o$.

The third relay means 86 controlled by the relay control 80 includes a first switch means $86a$ which, together with switch means $82a$ and $84a$, determines which room live monitor output $102_o$ or $104_o$ receives the live signal from the live signal input $40_i$. The other room live camera output receives its own camera video signal from diagnostic apparatus or video source input $100_i$ or $120_i$. A switch means $86b$ connects the record output $106_o$ with either the output of the switch means $84c$ or the second camera signal $18_2$ of the same room, whose signal is received on video source or diagnostic apparatus input $122_i$. A switch means $86c$ together with switch means $82b$, $84b$, and $84c$ determines whether the third live image signal input $42_i$, downscan input $52_i$, or the camera video signal $18_2$ received on input $90_i$ is to be connected to the same room VCR record output $108_o$. The switch means $86d$, together with switch means $82c$ and $84d$ determines which input is made available for interconnection to the reference signal output $46_o$, reference monitor ouput $94_o$, or reference monitor output $112_o$, specifically, the video source or diagnostic apparatus input $90_i$ from the camera of one of the rooms, the same room VCR playback signal input $110_i$ or the other room VCR playback signal input $92_i$. The switch means $86e$ selects a VCR playback signal $92_i$ or $110_i$ of one of the rooms to be available for the interconnection to the A/D output $30_o$ or a switch means 88a. A switch means 86f makes the third video input signal $18_3$ from the camera of one of the rooms received on video source or diagnostic apparatus input $96_i$ or $98_i$, available for the interconnection to the live signal output $41_o$ or to the reference signal output $46_o$.

The fourth relay means 88 controlled by the relay control 80 includes the first switch means 88a which, together with switch means 82c, 84d, and 86d make available the VCR playback video signals from inputs $92_i$ and $110_i$ to be displayed directly by their respective room reference monitors through outputs $94_o$ and $112_o$. A switch means 88b, together with switch means 82e, 84f, and 86f, makes either the second reference signal input $46_i$ or the third video signal $18_3$ from video source or diagnostic apparatus inputs $96_i$ or $98_i$ from one of the rooms available for interconnection to the reference signal output $46_o$. A switch means 88c, together with the switch means 82e, 84f, and 86f, selects either the signal received at the second live signal input $41_i$ or the third video signal $18_3$ from one of the rooms to be connected to the live signal output $41_o$. A switch means 88d selects whether the switch means 86e output or the switch means 84f output is connected to the A/D output $30_o$.

The fifth relay means 89 includes switch means 89a and 89b, which together with switch means 82c, 82d, 84d, 84e, 86d, 86e, and 88a, select whether the signal received on the first reference signal input $44_i$ or the VCR playback signal from input $92_i$ or $110_i$ is connected to the reference monitor output $94_o$ or $112_o$ of the same room. A switch means 89c determines whether the output of switch means 86d or the output of switch means 88b is to be connected to the reference signal output $46_o$.

The available interconnections among the above-discussed inputs and outputs are summarized in TABLE 1.

TABLE 1

| OUTPUTS | INPUTS | | | | | |
|---|---|---|---|---|---|---|
| | $40_i$ | $44_i$ | $52_i$ | $90_i$, $96_i$, $98_i$, $100_i$, $120_i$, $122_i$ | $92_i$ ($110_i$) | $30_i$ |
| live $40_o$ | X | | | X | | |
| reference $40_o$ | | X | | X | X | |
| downscan $52_o$ | X | | X | | | |
| VCR record $106_o$ ($108_o$) | X | | X | X | * | |
| live monitor $102_o$ ($104_o$) | X | | | X | | |
| ref monitor $94_o$ ($112_o$) | | X | | | X | |
| Diag image $30_o$ | | | | X | X | X |

The asterisk (*) denotes that the playback signal from one room can be recorded on the VCR of another room, particularly the other room associated with the same switch module.

It is to be appreciated that each switch module may switch among the flowthrough mode and more or less than the two associated procedure rooms described with the preferred embodiment. Moreover, it is to be appreciated that different relay and relay switch combinations may be used to select yet additional modes.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A diagnostic imaging system comprising:
    a plurality of procedure rooms which include a diagnostic imaging apparatus for producing a diagnostic image signal and a display means for displaying at least two images;
    an image processing system for processing diagnostic image signals generated by the diagnostic imaging apparatus of the rooms, the image processing system including an input for receiving diagnostic image signals from one of the rooms, a first processed image signal output for returning a first processed image signal processed from the received diagnostic image signals, a downscan output for providing a second processed image signal processed from the received diagnostic image signals, and a reference output for providing a reference image signal;
    a plurality of video switch modules connected together in series, each of the video switch modules including a first processed image signal input and a first processed image signal output, a reference image signal input, a reference image signal output, a downscan input, a downscan output, a diagnostic image signal input and a diagnostic image signal output; the video switch modules being connected in series such that the first processed image, reference image, downscan and diagnostic image signal outputs of one module are connected with the first processed image, reference image, downscan, and diagnostic image signal inputs of another module, the first processed image, reference image, and downscan inputs and the diagnostic image output of one of the video switch modules being connected with the image processing system; at least one diagnostic apparatus input which is interconnected with the diagnostic imaging apparatus of an associated one of the rooms and at least two monitor outputs which are connected with the display means of the associated one of the rooms;
    a control means for selectively causing:
        all of the video switch modules except one to interconnect their first processed image, reference image, downscan, and diagnostic image signal inputs with their first processed image, reference image, downscan, and diagnostic image signal outputs, respectively, in a flowthrough mode and
        one of the video switch modules to interconnect its diagnostic apparatus input with its diagnostic signal image output and to interconnect its two monitor outputs with a selectable two of its diagnostic image signal, first processed image, reference image, and downscan inputs in an activated mode.

2. The system as set forth in claim 1 wherein each room further includes a video recording means for selectively recording image data and playing back recorded image data and wherein each of the video switch modules further includes a video play signal input for receiving a play signal from the video recording means and a video record output for providing a record signal to the video recording means, each switching module in the activated mode selectively switching the video play signal input with a selectable one of the diagnostic image, monitor, and reference image outputs and selectively connecting the record output with a selectable one of the diagnostic image first processed image signal and downscan signal inputs.

3. The system as set forth in claim 2 wherein each switch module further includes at least a second diagnostic apparatus input such that each room can provide a plurality of diagnostic apparatus image signals, the switch module being operative to connect the second diagnostic apparatus input with at least one of the diagnostic image, record, monitor, first processed image, and reference outputs.

4. The system as set forth in claim 1 wherein the video switch modules which are connected in series are connected such that one switch module at one end of the series is connected with the image processing system and a switch module at a second end of the series is connected with a control room, the first processed image and reference image outputs of the second end video switch module being interconnected with first and second monitors of the control room.

5. The system as set forth in claim 4 wherein each switch module further includes a third processed image input, a second reference image input, a third processed image output, and a second reference image output, one of the processed image and reference outputs of the second end video switch module being connected with termination means.

6. The system as set forth in claim 5 wherein each switch module is further connected with a second room, each switch module further including a second room diagnostic apparatus input and at least two second room monitor outputs.

7. The system as set forth in claim 6 wherein both rooms further include a video image recording means, each of the video switch modules including a video play signal input for each room and a video record signal output for each room.

8. The system as set forth in claim 1 wherein each switch module further includes a plurality of relay means, the control means controlling the relay means in accordance with a digital address to control a switching mode of each switch module.

9. The system as set forth in claim 1 wherein the first processed image signals have a higher bandwidth than the second processed image signals.

10. A video switch module for a diagnostic imaging system which diagnostic imaging system includes a plurality of procedure rooms which each include a diagnostic imaging apparatus for producing a diagnostic image signal and a display means for displaying at least two images, an image processing means for processing diagnostic image signals generated by the diagnostic imaging apparatus of each of the rooms, the image processing means including an input for receiving diagnostic image signals, a first processed image output for providing first processed image process signals, a second processed image output for providing second processed image signals, and a reference output for providing a reference signal, and a plurality of the video switch modules connected together in series; the video switch module comprising:
a first processed image signal input, a first processed image signal output, a reference signal input, a reference signal output, a second processed image input, a second processed image output, a diagnostic image signal input, a diagnostic image signal output;
the video switch modules being connectable in series such that the first processed image, reference, second processed image, and diagnostic image signal outputs of one switch module are connected with the first processed image, reference, second processed image, and diagnostic image signal inputs of another switch module, the first processed image, reference, and second processed image inputs and the diagnostic image output of one of the switch modules being connectable with the image processing means;
at least one diagnostic apparatus input which is interconnectable with the diagnostic imaging apparatus of an associated room for receiving diagnostic image signals and at least two monitor outputs which are connectable with the display means of the associated procedure room;
a plurality of relay switching means for selectively connecting the first processed image, reference, second processed image, diagnostic apparatus and diagnostic image signal inputs and the first processed image, reference, second processed image, diagnostic image, and the monitor signal outputs; and
a control means for selectively controlling the relay switching means for selectively connecting:
the first processed image, reference, second processed image, and diagnostic image signal inputs with the first processed image, reference, second processed image, and diagnostic image signal outputs of another module in one mode and
the diagnostic apparatus input with the diagnostic image signal output and the two monitor outputs with a selectable two of the diagnostic apparatus input, first processed image input and reference input in another mode.

11. The switch module as set forth in claim 10 wherein each switch module further includes a video play signal input and a record output, the relay switching means selectively interconnects a selectable one of the diagnostic image signal, monitor, and reference outputs with the video play signal input, and the relay switching means selectably interconnects the record output with a selectable one of the diagnostic apparatus, first processed image, and second processed image inputs.

12. The switch module as set forth in claim 11 further including at least a second diagnostic apparatus input such that each room can provide a plurality of diagnostic apparatus signals, the switch module being operative to connect the second diagnostic apparatus input with at least one of the diagnostic image output, the record output, the monitor outputs, the first processed image output and the reference output.

13. The switch module as set forth in claim 10 further including a third processed signal input, a second reference input, a third processed signal output, and a second reference output.

14. The switch as set forth in claim 10 further including a second room diagnostic apparatus input and at least two second room monitor outputs.

15. The switch module as set forth in claim 14 further including first and second Video recorder play signal inputs and first and second video record signal outputs.

16. A switch module for interconnection with like switch modules for connecting a plurality of video input and display means with a central digital image processor, the switch module comprising:
a video source input for receiving unprocessed video image signals from a video source;

a first video display output for providing first processed video signals to a first video display means;

a second video display output for supplying second processed video signals to a second video display means;

a first processed video signal input for receiving the first processed video signals;

a first processed video signal output for supplying the first processed video signals to a first processed video signal input of another module;

a second processed video signal input for receiving the second processed video signals;

a second processed video signal output for supplying the second processed video signals to a second processed video signal input of another module;

an unprocessed video signal input for receiving unprocessed video signals from an unprocessed video signal output of another module;

an unprocessed video signal output for supplying unprocessed video signals to an unprocessed video signal input of another module;

switching means for;
(i) in a flowthrough mode, connecting the first processed video signal input to the first processed video signal output, connecting the second processed video signal input to the second processed video signal output, and connecting the unprocessed video signal input to the unprocessed video signal output; and
(ii) in another mode, connecting the video input means input to the unprocessed video signal output, connecting the first processed video signal input to the first display output, and connecting the second processed video signal input with the second display output.

17. The switch module as set forth in claim 16 further including a control means for controlling the switching means in accordance with received digital control signals.

18. A method of switching video signals among (i) procedure rooms having a diagnostic apparatus that generates unprocessed video signals, a first video monitor means for converting first processed video signals into a first human-readable image, a second video monitor means for converting second processed video signals into a second human-readable image, and a VCR means for recording and playing back second processed video signals and (ii) a digital image processor for processing unprocessed video signals to generate first and second processed video signals, the switch method utilizing a plurality of like switch modules connected in series, the method comprising:

switching a selected one of the switch modules into a room select mode and the other switch modules into a flowthrough mode;

feeding an unprocessed video signal into the selected one switch module;

feeding the unprocessed video signal from the selected one switch module through the other switch modules to the digital image processor;

feeding first and second processed video signals from the image processor through said other switch modules to the selected one switch module;

with the selected one switch module, (i) switching the first processed video signal to the first video monitor means, (ii) switching the second processed video signal to the second monitor means and (iii) switching the second monitor means to receive one of the second processed video signal and a playback signal from the VCR means.

* * * * *